United States Patent
Goudy (10) Patent No.: US 9,707,683 B2
(45) Date of Patent: Jul. 18, 2017

(54) APPARATUS FOR FORMING A SLEEVE ON A CONTAINER

(71) Applicant: The Procter & Gamble Company, Cincinnati, OH (US)

(72) Inventor: Eric Shawn Goudy, Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 14/520,876

(22) Filed: Oct. 22, 2014

(65) Prior Publication Data

US 2016/0114489 A1    Apr. 28, 2016

(51) Int. Cl.
| | |
|---|---|
| B25J 11/00 | (2006.01) |
| B65C 3/08 | (2006.01) |
| B65C 9/00 | (2006.01) |
| B65C 3/06 | (2006.01) |

(52) U.S. Cl.
CPC ............ B25J 11/005 (2013.01); B65C 3/065 (2013.01); B65C 3/08 (2013.01); B65C 9/00 (2013.01)

(58) Field of Classification Search
CPC . B25J 11/005; B65C 9/00; B65C 9/06; B65C 3/08; B65D 23/10
USPC ........................................................ 414/729
See application file for complete search history.

(56) References Cited

U.S. PATENT DOCUMENTS

| | | | | |
|---|---|---|---|---|
| 5,078,816 A | * | 1/1992 | Ratermann | ........... B65C 9/1869 156/351 |
| 5,524,787 A | | 6/1996 | Blake et al. | |
| 2002/0148569 A1 | * | 10/2002 | Stork | ...................... B29C 65/18 156/555 |
| 2005/0139568 A1 | | 6/2005 | Falk | |
| 2014/0290827 A1 | * | 10/2014 | Heeman | .................. B65C 3/065 156/64 |
| 2016/0114926 A1 | | 4/2016 | Goudy | |

FOREIGN PATENT DOCUMENTS

| | | |
|---|---|---|
| EP | 0609575 | 8/1994 |
| EP | 1083129 | 3/2001 |
| WO | WO 94/17982 | 8/1994 |
| WO | WO 01/19692 A1 | 3/2001 |

(Continued)

OTHER PUBLICATIONS

Non-Final Office Action for U.S. Appl. No. 14/919,219, mailed Jul. 1, 2016, 9 pages.

(Continued)

*Primary Examiner* — Alison L Hindenlang
*Assistant Examiner* — Mohamed K Ahmed Ali
(74) *Attorney, Agent, or Firm* — Gary J. Foose (57) ABSTRACT

An apparatus having: a conveyor having a machine direction and a cross-machine direction and a pair of edges spaced apart from one another in the cross-machine direction; a striker having a first position and a second position, wherein the striker in the first position is located at a predetermined location above the conveyor and laterally within the pair of edges, wherein in the striker in the second position is remote from the predetermined location; a driver operatively engaged with the striker to move the striker from the first position to the second position; and a vacuum port proximal to the striker when the striker is in the first position.

18 Claims, 10 Drawing Sheets

(56) References Cited

FOREIGN PATENT DOCUMENTS

WO     WO 2013/070068 A1     5/2013
WO     WO 2013/104433 A1     7/2013

OTHER PUBLICATIONS

International Search Report and Written Opinion, PCT/US2015/056660, date of mailing Feb. 5, 2016.
Non-Final Office Action for U.S. Appl. No. 14/520,885, dated Dec. 2, 2016.
Non-Final Office Action for U.S. Appl. No. 14/919,219, dated Jul. 1, 2016.
Notice of Allowance and Fees due for U.S. Appl. No. 14/919,219, dated Nov. 2, 2016.

\* cited by examiner

APPARATUS FOR FORMING A SLEEVE ON A CONTAINER

FIELD OF THE INVENTION

Forming a shrink sleeve on a container.

BACKGROUND OF THE INVENTION

Shrink sleeve labels are widely used for decorating containers. Shrink sleeve labels provide several advantages over other labeling and decoration techniques including the ability to decorate the entire peripheral wall of irregularly shaped packages, the ability to generate a variety of visually distinct packages using a single container shape, and the ability make rapid changes to artwork for packages.

For some packages, designers desire to have an opening in the shrink sleeve to provide a window through which the underlying container and or contents of the container are visible or to provide a location to grip the package. Openings can be provided in shrink sleeves by including a pre-cut hole in the shrink sleeve prior to the shrink sleeve being placed over the container and subsequently shrunk. A problem with this approach is that there are technical difficulties with precisely registering the shrink sleeve with the container so that the pre-cut hole, when shrunk, is located as desired, particularly for high speed packaging lines. Further, as the shrink sleeve is shrunk, the hole can tend to become uncontrollably irregularly shaped as tension develops in the shrink sleeve. For containers having a grip, such as an indention, pair of indentions, or through handle, a pre-cut hole in a shrink sleeve that is poorly registered with such feature can result in a grip that has decreased functionality. The decrease in functionality can arise as a result of portions of the shrink sleeve adjacent the cut-out covering portions of the container that the package designer desires the consumer to be able to contact directly. Such an arrangement can result in the consumer having to form part of her grip on the package over an unexpectedly slick shrink sleeve, which can cause the package to slip from her grasp in use. The decrease in functionality can also arise as a result of an edge of the pre-cut hole ending up in a location at which the shrink sleeve is not able to maintain contact with the container after the shrink sleeve is shrunk. Such an arrangement can impede the consumer's ability to securely grasp the grip.

A hole can be created in a shrink sleeve after the shrink sleeve is shrunk onto the container. For a container having a grip, a hole can be punched in the shrink sleeve. Punching a hole in a shrink sleeve after the shrink sleeve has been shrunk onto the container can result in irregular holes being formed. That is, the resulting holes can have an irregular and uncontrolled shape in and of the hole itself and there can be irregularity amongst holes created across multiple packages formed on a single manufacturing line.

With these limitations in mind, there is a continuing unaddressed need for a process and apparatus for forming holes in shrink sleeve labels.

SUMMARY OF THE INVENTION

An apparatus comprising: a conveyor having a machine direction and a cross-machine direction and a pair of edges spaced apart from one another in the cross-machine direction; a striker having a first position and a second position, wherein the striker in the first position is located at a predetermined location above the conveyor and laterally within the pair of edges, wherein in the striker in the second position is remote from the predetermined location; a driver operatively engaged with the striker to move the striker from the first position to the second position; and a vacuum port proximal to the striker when the striker is in the first position.

DETAILED DESCRIPTION OF THE INVENTION

Figure 1:
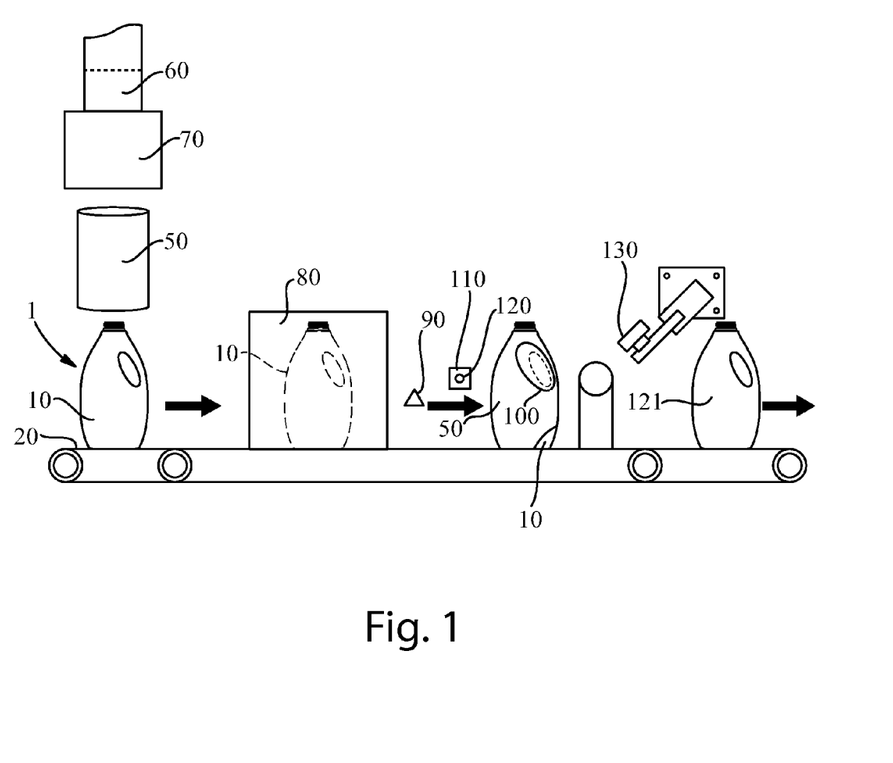
FIG. 1 is a profile view of a portion of a shrink sleeving line.

A shrink sleeving line 1 is shown in FIG. 1. The shrink sleeving line 1 can comprise a conveyor 20. A container 10 can be provided on a conveyor 20. A shrink sleeve 50 can be applied to the container before or after filling and or capping of the container. Most commonly, a shrink sleeve 50 is applied to the container prior to filling and capping. The container 10 can be filled by a filling device before or after the container 10 arrives at the sleeve handling device 70 and heating zone 80. The container can be filled with a composition. Exemplary compositions can include powders, granules, liquids, and gels. The composition can be liquid laundry detergent, liquid shampoo, household cleaning product, powder laundry detergent, liquid soap, liquid dish detergent, liquid bleach, liquid fabric treatment composition, liquid food product, or any other material that can be dispensed into a container 10 for subsequent use or dispensing by a person.

A shrink sleeve 50 is applied to the container 10 at some location on the shrink sleeving line 1. The shrink sleeve 50 can be applied to the container 10 up-line of the location at which the container 10 is filled. A shrink sleeve 50 can be provided to the shrink sleeving line 1 in a continuous web 60 of multiple shrink sleeves 50. An individual shrink sleeve 50 can be cut from the web 60, opened, and then placed over the container 10. This operation is done using a shrink sleeve handling device 70.

Once the shrink sleeve 50 is applied to the container 10, the container 10 and shrink sleeve 50 applied thereto are passed through a heating zone 80. Within the heating zone 80, the temperature of the shrink sleeve 50 is increased to a temperature at which the shrink sleeve 50 shrinks and conforms to the container 10.

At one or more locations along the line 1, a sensor 90 can be located so as to be able to detect the presence of a container 10 as it is conveyed down-line on the conveyor. The sensor 90 can be connected in to a computing system that can track the position of containers 10 as they are conveyed down-line along the line. The sensor 90 can be a photo eye mounted up-line of the striker 130. The sensor can detect the leading edge of the container 10. By having a known distance between sensor 90 and the predetermined location and a known speed of the conveyor 20 or distance of conveyor 20 movement, the time for contacting the striker 130 to the predetermined removeable portion can be determined. The sensor can be a Keyence FS-N11P fiber amplifier combined with a FU-61 fiber optic sensor available from, Keyance, Osaka, Japan.

A predetermined removeable portion 100 can be provided in the shrink sleeve 50. The predetermined removeable portion 100 can be provided in the shrink sleeve 50 prior to the shrink sleeve being applied to the container 10 or after the shrink sleeve 50 is conformed to the container 10. After the shrink sleeve 50 is conformed to the container 10, a predetermined removeable portion 100 can be provided by cutting the shrink sleeve 50. The shrink sleeve 50 can be cut at the predetermined removeable portion 100 by a cutter 110. The cutter 110 can be a laser 120 or a die or other tooling capable of cutting a predetermined removeable portion 100 on a container 10. The cutter 110, the cutter 110 optionally being a laser 120, can be posited up-line of the striker 130.

The conveyor 20 can operate continuously or be indexed. For high speed filling operations, for example filling more than about 60 containers per second in a single lane of a single line 10, a continuously moving conveyor 20 can be practical.

Once the predetermined removeable portion 100 is cut into the shrink sleeve 50, the predetermined removeable portion 100 can be removed by a striker 130. Once the predetermined removeable portion 100 is removed, the finished package 121 is conveyed further down-line.

Figure 2:
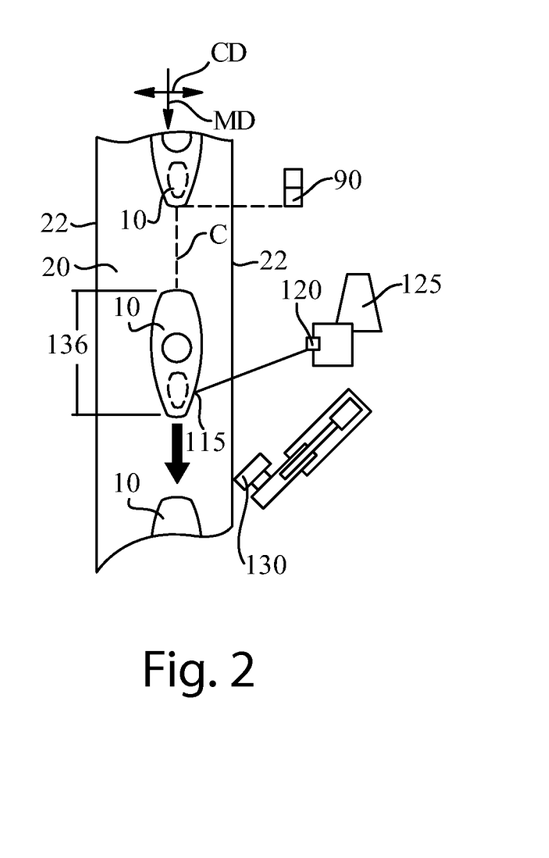
FIG. 2 is a top view of a portion of a shrink sleeving line.

FIG. 2 is a drawing illustrating in more detail the cutting operation on the line 1. As the container 10 having the shrink sleeve 50 conformed thereto encounters the sensor 90, the sensor 90 can transmit data to the controller 125 of a laser 120. The controller 125 can be a computer that is separate from the laser 120 or integrated within the laser 120. Further input to the controller 125 can be the speed of the conveyor 20. By knowing the speed of the conveyor 20 and the location of the sensor 90 relative to the laser 120, the laser 120 can be turned on when the predetermined portion 100 is located in front of the laser 120 such that the predetermined portion 100 can be cut.

The laser 120 can be positioned to a side of the conveyor 20. The laser 120 can have an operating window 136 within which the laser spot 115 can operate on the portion of the shrink sleeve 50 that ultimately becomes the predetermined removeable portion 100. The laser spot 115 can be directed by a mechanism that changes the position of the laser 120. More simply, the laser spot 115 can be directed by a plurality of reflectors in the laser 120.

The laser controller 125 can control the power of the laser beam, the direction of the laser beam, the location of the laser spot 115, and on and off of the laser beam. The laser controller 125 can have a memory that stores a program for the power of the laser beam, the direction of the laser beam, the location of the laser spot 115, and on and off of the laser beam.

The laser controller 125 can contain a program that sets forth a path for the laser spot 115 to follow when the laser 120 is turned on. The path can be a three-dimensional path in which the direction and depth of the laser spot 115 are prescribed or a two-dimensional path. The depth of laser spot 115, which is the distance from the laser 120 to where the laser 120 is focused, can follow the location of the shrink sleeve 50.

If the conveyor 20 is indexed, the conveyor can be stopped in front of the laser 120 and the predetermined removeable portion 100 can be formed in the shrink sleeve 50. If greater line speed is desired and the conveyor 20 is in continuous motion, the programming for the laser 120 can include terms that factor in the speed of the line to compute the path for the laser spot 115. In this arrangement, the laser spot 115 is traced on the moving shrink sleeve 50. With programming of the laser controller 125, the laser spot 115 can just cut the shrink sleeve 50 in the desired locations to form the predetermined removeable portion 100.

The laser 120 can be a 60 Watt, 10200 nm carbon dioxide laser having a fixed focus, variable focus, or automatic focus. The laser 120 can be an infrared or far infrared laser 120.

A striker 130 moving tangentially relative to the predetermined removeable portion 100 can be provided to remove the predetermined removeable portion 100. The striker 130 can be a structure that moves tangentially relative to the predetermined removeable portion 100. The predetermined removeable portion 100 can be removed by contacting the striker 130 to the predetermined removeable portion 100.

The container 10 with the shrink sleeve 50 installed thereon may be thought of as presenting a surface that is partially covered with the predetermined removeable portion 100. By having the striker 130 move tangentially relative to the predetermined removeable portion 100, the predetermined removable portion 100 can be removed from the remainder of the shrink sleeve 50 by a dominantly shearing movement of the predetermined removable portion 100 relative to the remainder of the shrink sleeve 50 at the initiation of removal of the predetermined removeable portion 100. Relative movement of the predetermined removeable portion 100 and the remainder of the shrink sleeve 50 in shear can be provided for using a variety of simple mechanisms such as the striker 130.

Typically, shrink sleeving line 1 is operated in a continuous high speed manner. It is not uncommon for line speeds to be in excess of about 300 bottles per minute within a single lane. Providing for relative shearing movement of the predetermined removable portion 100 relative to the remainder of the shrink sleeve 50 tends to be mechanically more simple than providing for initial removal of the predetermined removeable portion in a direction normal to shrink sleeve 50 or with a large component of movement that is in a direction normal to the shrink sleeve 50. Of course, in consideration that the predetermined removeable portion 100 is being removed from the shrink sleeve 50, the predetermined removable portion 100 will at some time be moved in a direction having at least some component of movement that is normal to the shrink sleeve 50. Nevertheless, at the initial moment of contact between the striker 130 and the predetermined removeable portion 100 it can be desired to provided for initial relative movement of the predetermined removeable portion 100 relative to the remaining portion of shrink sleeve 50 such that the directional component of relative movement in a direction normal to the remainder of the shrink sleeve 50 is relatively small. For instance, the magnitude of the normal component of movement of the predetermined removable portion 100 can be less than about 25% of the tangential component of movement of the predetermined removable portion 100.

The conveyor 20 can be considered to have a machine direction MD which is the direction the conveyor 20 moves when the shrink sleeving line 1 is in operation. The conveyor 20 can also be considered to have a cross-machine direction CD orthogonal to the machine direction. The conveyor 20 can have a pair of spaced apart edges 22, the edges spaced apart in the cross-machine direction. The conveyor 20 can have a centerline C.

Figure 3:
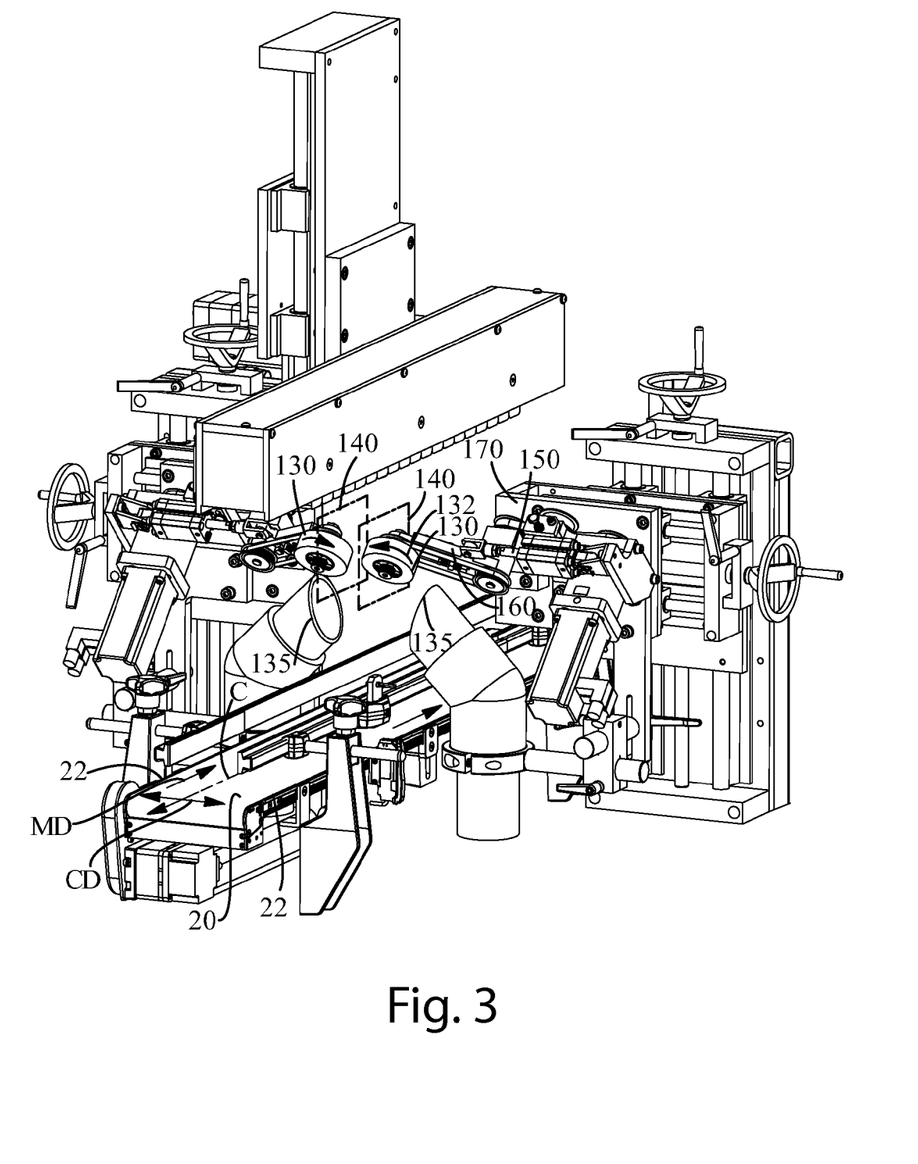
FIG. 3 is a view of a portion of an apparatus for removing a predetermined removeable portion with the striker in a first position.

The striker 130 can have a first position and a second position. In the first position, the striker 130 can be located at a predetermined location 140 above the conveyor 20 and laterally within a pair of edges 22 of the conveyor, as shown in FIG. 3.

The predetermined location 140 is a location in space within which the striker 130 will contact the predetermined removeable portion 100 to remove the predetermined removeable portion 100 from the shrink sleeve 50. As a container 10 approaches the striker 130, the striker 130 can transition from a second position in which the striker is remote from the conveyor 20 into the first position in which the striker 130 can remove the predetermined removeable portion 100 from the shrink sleeve 50.

Transitioning from the second position into the first position can be thought of as the overall movement of the striker. In the first position, the striker 130 can be locally moving tangentially relative to the predetermined location 140. The local tangential movement of the striker 130 can be independent of the overall movement of the striker from the second position to the first position and from the first position to the second position. For instance the striker 130 can comprise a rotating roller 132, or rotating belt or other moving structure, the surface of which is moving tangentially relative to the predetermined location 140. If the striker 130 is a rotating roller 132 as shown in FIG. 3, the direction of rotation of the striker 130 can be as indicated by the arrows marked on the striker 130. An analogous situation in which this description is fitting is if a person has her bicycle in an upright stationary position with the front wheel raised and the front wheel is rotating and there is a piece of loose leaf paper on the ground beneath the spinning wheel. The bicycle wheel is analogous to the striker 130 and the loose leaf paper is analogous to the predetermined removable portion 100. As she lowers the front wheel towards the ground in an overall movement, the surface of the tire on the wheel is locally moving tangentially relative to the loose leaf paper. When the bicycle wheel touches the loose leaf paper, the loose leaf paper will be whisked away from the ground. In the context of the shrink sleeve line 1 described herein, the container 10 on which the shrink sleeve 50 is conformed is also moving in translation and the striker 130 moves to and from the predetermined location 140 and makes contact with the predetermined removable portion 100.

The path of overall movement of the striker 130 can be set so that the striker 130 is locally moving tangentially relative to the predetermined removeable portion 100 when the striker encounters the predetermined location 140 and predetermined removeable portion 100. Such an arrangement can be like a person holding her fist slightly above a flat table with her fingers oriented towards the table and extending her index finger straight out and then with a local sweeping movement of her index finger scraping the surface of the table. Once she scrapes the table she can lift her arm upwardly away from the table.

As shown in FIG. 3, the shrink sleeve line 1 can be provided with two strikers 130. The conveyor 20 can have a machine direction MD and a cross-machine direction CD. The two strikers 130 can be on opposite sides of a projection of the conveyor centerline C in a direction orthogonal to the machine direction MD and cross-machine direction CD above the conveyor 20 and between the two strikers 130. A projection of the conveyor centerline C can be thought of as a line coincident with a plane orthogonal to a plane lying in the machine direction MD and cross-machine direction CD of the conveyor 20.

As shown in FIG. 3, the shrink sleeve line 1 can be provided with strikers 130 on opposing sides of the conveyor 20. Such an arrangement can be practical when on opposing sides of the container 10 there are predetermined removable portions 100. For instance, if the container has a through handle or opposing gripping indents on opposing sides of the container, the predetermined removable portions 100 can be removed to expose the through handle or opposing gripping indents. The strikers 130 on opposing sides of the conveyor 20 can be located on opposing sides of the conveyor 20 at a common location along the machine direction MD of the shrink sleeve line 20. The shrink sleeve line 1 can be operated such that the opposing strikers 130 operatively engage the predetermined removable portion 100 substantially simultaneously. Such an arrangement for operation can help maintain stability of the container 10 as is moves down the shrink sleeve line 1. The strikers 130 can be located at different positions along the conveyor 20. In that arrangement one striker 130 can act on one side of the container 10 first after which the other striker 130 on the opposing side of the conveyor 20 acts on the other side of the container 10. With either of these arrangements for the location of the strikers 130, predetermined removable portions 100 on both sides of the container 10 can be removed. The striker 130 can be mounted on an arm 160. The arm 160 can move the striker 130 to and way from the predetermined location 140.

Figure 4:
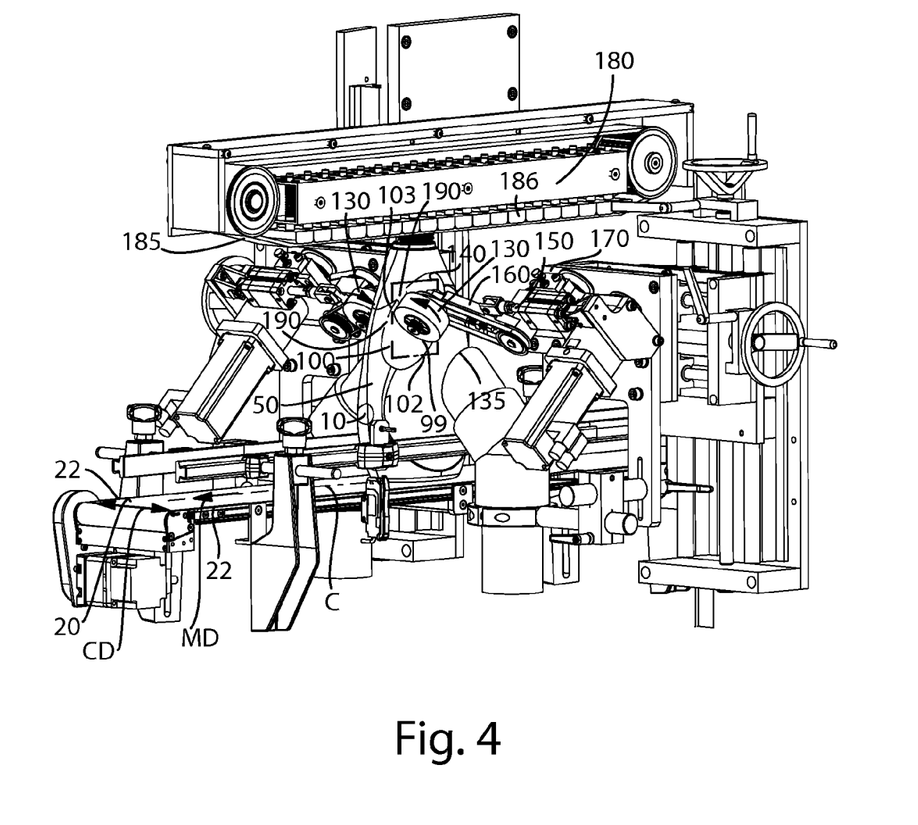
FIG. 4 is a view of a portion of an apparatus for removing a predetermined removeable portion with the striker in a second position.

FIG. 4 illustrates the shrink sleeve line 1 with a container 10 having a shrink sleeve 50, with the predetermined removable portion 100 located partially within the predetermined location 140 and the striker 130 also located to contact the predetermined removable portion 100. Also shown in FIG. 4 is a top restraint guide 180. The predetermined location 140 can be at a fixed location relative to the shrink sleeve line 1. The top restraint guide 180 can comprise a belt 185 having a drive direction in the machine direction MD. The belt 185 can be fed over a plurality of blocks 186 to provide for support of the belt 185

When the container 10 is in a position such that the predetermined removable portion 100 and the predetermined location 140 are coincident, the striker 130 can contact the predetermined removable portion 100 and pull the predetermined removable portion 100 away from the remainder of the shrink sleeve 50. In operating the shrink sleeving line, movement of the striker 130 can be programmed such that movement of the striker 130 from the second position towards the first position is initiated as the container 10 approaches predetermined location 140 such that the striker 130 and the predetermined removable portion 100 arrive at the predetermined location 140 substantially simultaneously.

The striker 130 is the element that removes the predetermined removeable portion 100. The striker 130 can be a compliant material that can transfer force from the striker 130 to the predetermined removeable portion 100. The striker 130 can be a mass of compliant material that is coated with an adhesive material. As the striker 130 contacts the predetermined removeable portion 100, the striker 130 and predetermined removeable portion 100 become operatively engaged with one another. As further movement of the striker 130 occurs, the striker 130 captures the predetermined removeable portion 100 and pulls it away from the remainder of the shrink sleeve 50. The predetermined removeable portion 100 can be captured by the striker 130 by having the striker 130 pinch the predetermined removeable portion 100 between the striker 130 and a portion of the container 10. That is, the predetermined removable portion 100 can be pinched between the container 10 and the striker 130 during removal of the predetermined removable portion 100 at a pinch zone 99. By pinching the predetermined removable portion 100 between the striker 130 and a portion of the container 10, engagement between the striker 130 and the predetermined removable portion 100 can be enhanced because the normal force between the striker 130 and predetermined removable portion 100 is greater than if there is no pinching. The predetermined removable portion 100 can be transported away from the striker 130 by a vacuum port 135 that is proximal to the striker 130 when the striker 130 is in the first position. The predetermined removeable portion 100 can be conveyed by vacuum after the predetermined removeable portion 100 is removed from or separated from the remainder of the shrink sleeve 50.

As described herein, the striker 130 can be a structure that moves tangentially relative to the predetermined removable portion 100. As shown in FIG. 4, relative to this movement of the striker 130, it can be convenient to consider that the predetermined removable portion 100 has a downstream edge 102 and an opposing upstream edge 103. The downstream edge 102 can be an edge of the predetermined removable portion 100 in a direction of movement of the striker 130 relative to the predetermined removable portion 100. The upstream edge 103 can be joined to the shrink sleeve 50 by a chad 190 or a plurality of chads 190 prior to removing the predetermined removeable portion 100. Downstream and upstream with respect to the downstream edge 102 and upstream edge 103 are understood to be relative to direction of movement of the striker 130.

In the arrangement shown in FIG. 4, the striker 130 is rotating in the direction as indicated by the arrow marked on the striker 130. When the striker 130 contacts the predetermined removable portion 100, the predetermined removable portion 100 can be mobilized in tension. The predetermined removable portion 100 is then pulled away from the shrink sleeve 50 by pulling on the chad 190 or chads 190. Optionally, the predetermined removable portion 100 can be pinched between the striker 130 and the container 10 as the striker 130 rips the predetermined removable portion 100 away from the remainder of the shrink sleeve 50.

The movement of the striker 130 and location of the chad 190 or chads 190 can be coordinated with one another such that the striker 130 cleanly separates the predetermined removable portion 100 from the shrink sleeve 50. It is thought that clean separation can be achieved by positioning the chad 190 or chads 190 such that tension is the dominant failure mode of the chad 190 or chads 190. When the predetermined removable portion 100 is contacted by the striker 130, the chad 190 or chads 190 can be positioned so that tension is the dominant failure mode of the chad 190 or chads 190.

The striker 130 can be positioned in any number of orientations. Without being bound by theory, it is thought that by coordinating positioning of the striker 130 and the location of the chad 190 or chads 190, the failure mode of the chad 190 or chads 190 when contacted by the striker 130 can be controlled, with failure mode being dominated by tension being a practical failure mode. Without being bound by theory, it is thought that a failure mode dominated by shear of the chads 190 or chad 190 can result in a less neat separation of the predetermined removable portion 100 from the remainder of the shrink sleeve 50. Shearing of the chad 190 or chads 190 when the striker 130 contacts the predetermined removeable portion 100 may cause an uncontrolled rip in the shrink sleeve 50, which can be functionally and aesthetically displeasing.

Figure 5:
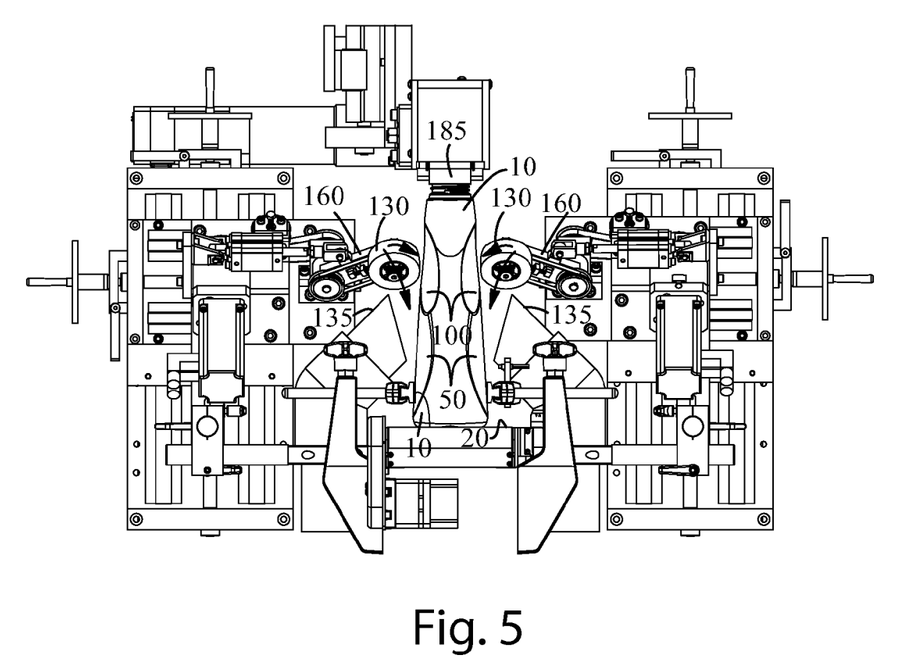
FIG. 5 is a container having a through handle.
Figure 6:
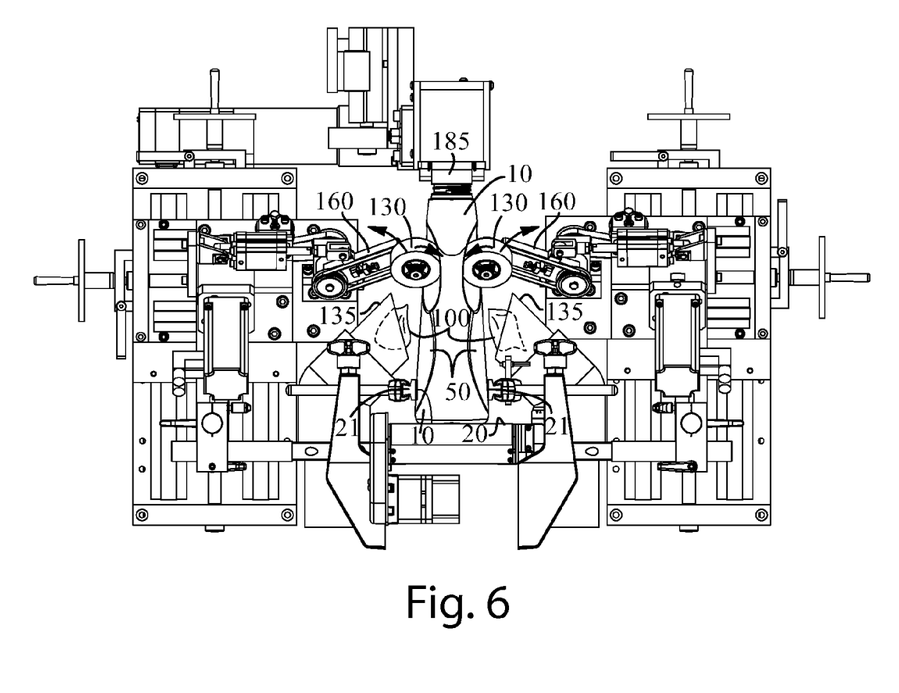
FIG. 6 is a container having a pinch grip.

FIGS. 5 and 6 are end views of the shrink sleeve line 1, the view being such that the container 10 is moving away from the observer. In FIG. 4, the container 10 is located on the shrink sleeve line such that the predetermined removable portion 100 is approaching the predetermined location 140. As the predetermined removable portion 100 approaches the predetermined location 140, the striker 130 initiates movement from the second position to the first position towards the predetermined location 140. The predetermined removable portion 140 and the striker 130 arrive at the predetermined location 140 at substantially the same time. The predetermined removable portion 100 is torn from the remainder of the shrink sleeve 50 by the striker 130 and the vacuum port removes the predetermined removable portion 100 from the striker 130, as shown in FIG. 6.

In FIG. 5, the striker 130 is in the second position in which the striker 130 is remote from the predetermined location 140. In FIG. 6, the striker 130 is in the first position in which the striker 130 is located in the predetermined location 140 to remove the predetermined removable portion 100. In FIG. 5, the direction of the global movement of the striker 130 towards the predetermined location 140 is indicated by arrows through the axis of rotation of the striker 130. In the second position, the striker 130 or strikers 130 can be remote from the predetermined location 140 such that the widest portion of the container 10 in the cross machine direction CD can pass the striker 130 or pass between the strikers 130.

In one arrangement, the conveyor 20 is moving a container 10 down-line at a continuous speed. The striker 130 transitions from the second position remote from the predetermined location 140 to the first position in which the striker 130 contacts the predetermined removable portion 100 in the predetermined location 140. Relative movement between the striker 130 and the predetermined removable portion 100 can be provided by a mechanism selected from the group consisting of the conveyor 20 conveying the container 10 down-line, motion of the striker 130, and combinations thereof.

The shrink sleeving line 1 can further comprise a top restraint guide 180. The top restraint guide 180 can be positioned over the conveyor 20. The container 10 can be between the top restraint guide 180 and conveyor 20 when the striker 130 strikes the predetermined removeable portion 100. Together, the top restraint guide 180 and conveyor 20 can apply an axial compression force to the container 10. By having the container 10 in compression when the striker 130 strikes the predetermined removeable portion 100, the container 10 can be restrained from moving beyond an acceptable amount when the striker 130 strikes the predetermined removeable portion 100.

The striker 130 can be a roller 132. The roller 132 can be a motor driven roller 132. A motor driven roller 132 in which the roller is rotating is thought to be practical in that as the roller 132 is moved into contact with the predetermined removeable portion 100 the roller 132 frictionally engages with the predetermined removeable portion 100 and pulls the predetermined removable portion 100 from the remainder of the shrink sleeve 50. To enhance the ability for the roller 132 to remove the predetermined removeable portion 100 from the shrink sleeve 50, the roller 132 can be driven to rotate in a direction such that there is a component that is in line with or opposite to the direction of movement of the conveyor 20.

The roller 132 can comprise a compliant surface. The roller 132 can comprise a surface that can develop force mobilized in shear between the roller 132 and the predetermined removeable portion 100. The surface of the roller 132 needs to be sufficiently tacky with respect to the predetermined removeable portion 100 so that the roller 132 can pull the predetermined removeable portion 100 from the remainder of the shrink sleeve 50. For typical shrink sleeves 50, a roller 132 having a rubber surface is practical.

The roller 132 can be a Fairlane Products nitrile shaft mount drive roller having a 6.35 cm outside diameter, 1.5875 cm shaft diameter, 2.3368 cm width, and 20 A durometer, part number RR-9502-20W-EX625 available at www.fairlaneproducts.com. The roller 132 can be rotated at about 900 revolutions per minute. The roller 132 can be rotated at a velocity between about 50 revolutions per minute to about 5000 revolutions per minute. The roller 132 can be rotated at a velocity between about 200 revolutions per minute to about 1500 revolutions per minute. The roller 132 can be rotated at a velocity between about 700 revolutions per minute to about 1000 revolutions per minute.

Movement of the striker 130 between the first position and second position can be provided for by a driver 150 operatively engaged with the striker 130 to move the striker 130 from the first position to the second position and from the second position to the first position. A variety of mechanisms are contemplated for the driver 150. And a variety of mechanical linkages between the driver 150 and the striker 130 are contemplated.

The striker 130 can be pivotably mounted. In such an arrangement the striker 130 partially rotates to and from the predetermined location 140 to encounter the predetermined removable portion 100. Such an arrangement is shown in FIGS. 3, 4, 5, and 6 in which a driver 150 is operatively engage with the striker 130. The striker 130 can be mounted to an arm 160. The arm 160 can be pivotably mounted to a frame 170. The driver 150 can be operatively engaged with the arm 160. The driver 150 can be an air or hydraulic cylinder that can be forcefully extended and retracted. The driver 150 can be a solenoid. As the driver is extended and retracted, the arm 160 can rotate about a pivot, thereby moving the striker 130 to and from the predetermined location 140. The driver 150 can be a mechanism selected from the group consisting of a servo motor, an air cylinder, a rotating motor connected to a 4-bar crank-rocker linkage, and a linear servo motor. If an air cylinder is employed, Festo air cylinder ADN-20-25-1-P-A #536238 can be practical.

The striker 130 can be reciprocatingly mounted. In such an arrangement, the striker 130 translates to and from the predetermined location 140 to encounter the predetermined removeable portion. Reciprocating movement can be provided, by way of non-limiting example, by an air cylinder, hydraulic cylinder, solenoid, a rotating motor connected to a 4-bar crank-rocker linkage, or other suitable mechanism.

Extension and retraction of the driver 150 can drive movement of the striker 130 from the first position in which the striker 130 is located at the predetermined location 140 above the conveyor 20 and laterally within the pair of edges 22 of the conveyor 20 to the second position in which the striker 130 is remote from the conveyor 20 and back again to the first position, intermittently. An example of the second position is shown in FIG. 5. In the second position, the striker 130 needs to be located such that containers 10 can pass on the line 1 unobstructed by the striker 130. For typical containers 10 having a handle, the body of the container 10 will be contoured such that the side of the container 10 presented to the striker 130 is curved, contoured, or otherwise shaped in a direction generally aligned with the machine direction MD. Regardless of whether the predetermined removeable portion 100 is in a leading position or trailing position as the container 10 is conveyed down-line, the striker 130 needs to have a second position in which the striker 130 does not interfere with the passing container 10. The position in which the striker 130 does not interfere with the passing container 10 is defined as the second position and the striker 130 is considered remote from the predetermined location 140 in this second position.

As containers 10 are conveyed down-line, the striker 130 is moved intermittently between the first position and the second position. As a container 10 is conveyed down-line, the predetermined removeable portion 100 is transported to be within the predetermined location 140. Arrival of the striker 130 in the first position is timed to coincide with arrival of the predetermined removeable portion 100. As the striker 130 moves into the first position from the second position, the striker 130 strikes the predetermined removeable portion 100 and whisks the predetermined removeable portion 100 away from the remaining shrink sleeve 50. The striker 130 then moves away from the predetermined location 140 to be in a position remote from the predetermined location 140.

The shrink sleeving line 1 can comprise a top restraint guide 180 positioned above the conveyor 20. As the container 10 is conveyed to be between the tope restraint guide 180 and the conveyor 20, axial stress is gradually applied to the container 10 by the container 10 becoming compressed between the top restraint guide 180 and the conveyor 20. The top restraint guide 180 can comprise a belt 185 having a drive direction in the machine direction MD. The belt 185 can be a Misumi Timing Belt H 50.8 L=1600 #TBN630H200 Rubber belt 50.8 mm wide having a glass fiber core and a circumference of 1600.2 mm and 126 trapezoidal teeth. The belt 185 can be fed over a plurality of DELRIN blocks 186 to provide for support of the belt 185

The belt 185 can be supported by blocks 186 or contoured bar that as the belt 185 engages the top of the container 10, axial stress is gradually applied to the container 10 by the container becoming compressed between the belt 185 and the conveyor 20. The top restraint guide 180 can restrain the container 10 vertically relative to the machine direction MD and cross machine direction CD.

In operation, the process for forming a sleeved container 10 can comprise the steps of: conveying a container 10, placing a shrink sleeve 50 around the container 10; conforming the shrink sleeve 50 to the container 10 by shrinking the shrink sleeve 50; providing a predetermined removeable portion 100 in the shrink sleeve 50, providing a striker 130 moving tangentially relative to the predetermined removeable portion 100, and removing the predetermined removable portion 100 of the shrink sleeve 50 by contacting the striker 130 to the predetermined removable portion 100.

It can be practical to convey the container 10 in a machine direction MD and restrain the container 10 in the cross machine direction CD, which is orthogonal to the machine direction MD, when the striker 130 contacts the predetermined removeable portion 100. In other words, the container 10 can be restrained in a direction orthogonal to a direction in which the container 20 is conveyed. Such restraint can be practical if the striker 130 applies appreciable force to the container 10 that might knock the container 10 out of position on the conveyor 20 or knock over the container 20. Restraint of the container in the cross machine direction CD can be provided by one or more rails 21 positioned behind the container 20 relative to the striker 130. The rails 21 can run in line with the conveyor 20. The rail 21 or rails 21 can be elevated relative to the conveyor 20.

Figure 7:
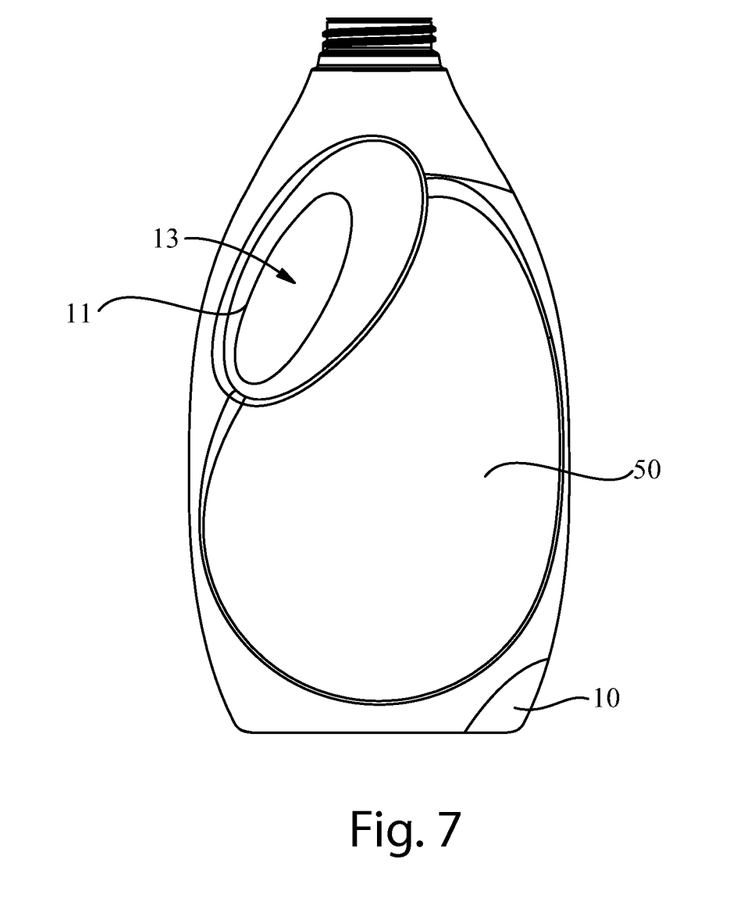
FIG. 7 is a container having a through handle with a shrink sleeve conformed thereto with the predetermined removeable portion still engaged with the remainder of the shrink sleeve.
Figure 8:
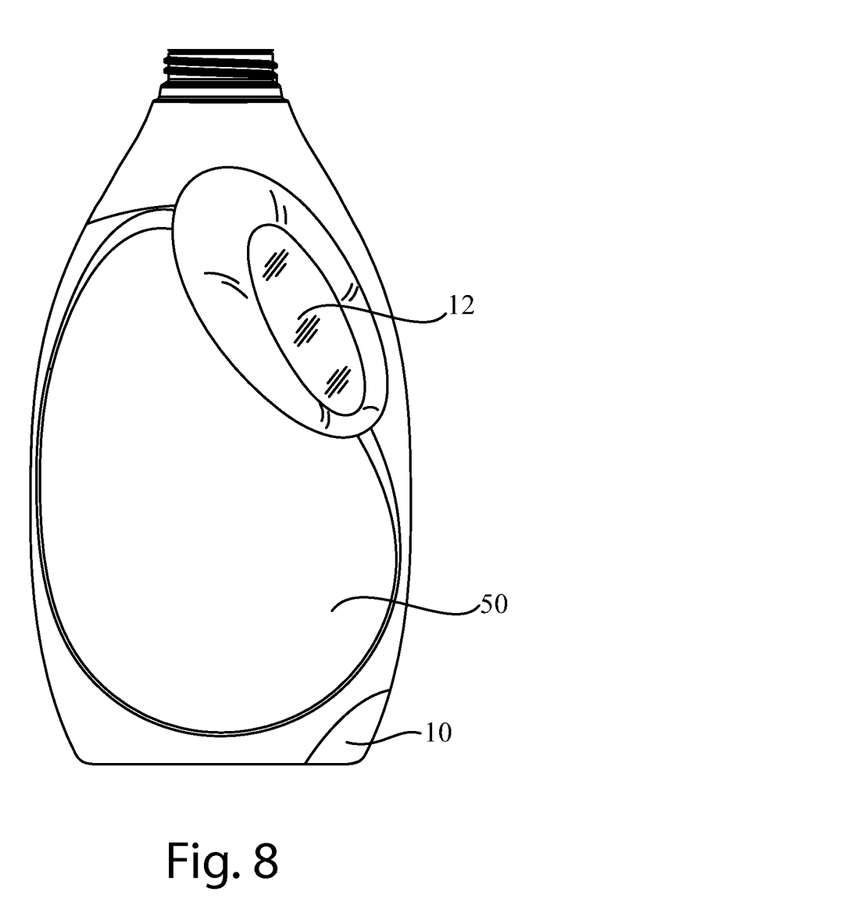
FIG. 8 is a container having a through handle with a shrink sleeve conformed thereto with the predetermined removeable portion still engaged with the remainder of the shrink sleeve, the striker in the first position.

The container 10 can have a through handle 11, as shown in FIG. 7. The through handle 11 may have a through handle open area 13. Optionally, the container 10 can have a pinch grip 12, as shown in FIG. 8. The predetermined removeable portion 100 can be proximal the through handle 11 or pinch grip 12, whichever the case may be as for the type of feature that is provided for the consumer to grasp.

Figure 9:
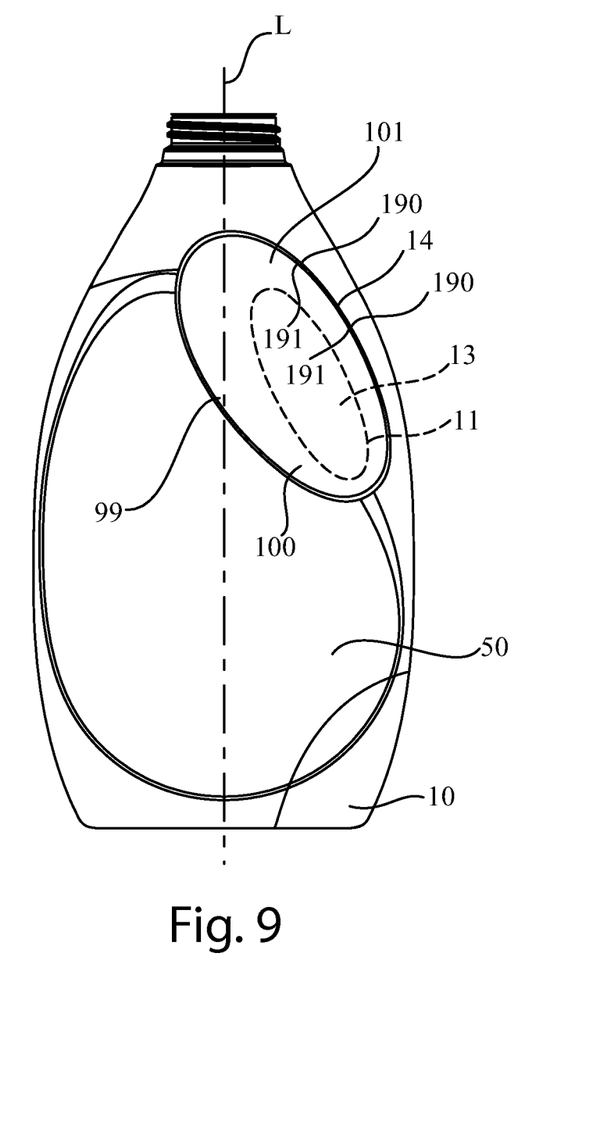
FIG. 9 is a view of a portion of an apparatus in which the striker is a belt.

FIG. 9 is a drawing of container 10 to which a shrink sleeve 50 is conformed to the container 10 and the predetermined removeable portion 100 is joined to the shrink sleeve 50 by one or more chads 190. The predetermined removeable portion 100 can be formed by any of the processes disclosed herein, including laser cutting. The chad 190 can be a portion of the shrink sleeve 50 that joins the shrink sleeve 50 to the predetermined removeable portion 100. One or more chads 190 can join the predetermined removeable portion 100 to the shrink sleeve 50. The chad 190 or chads 190 are uncut portions of the shrink sleeve 50 that join the predetermined removeable portion 100 to the remainder of the shrink sleeve 50. The chad 190 or chads 190 are left behind by whatever operation, by way of non-limiting example a laser, is used to cut the predetermined removeable portion 100 from the shrink sleeve 50. By way of non-limiting example, the chad 190 or chads 190 can be left behind when a laser 120 is used to cut the predetermined removeable portion 100. To leave behind the chad 190 or chads 190, as the laser 120 traces the predetermined removeable portion 100, the laser 120 can be briefly turned off and then turned on again to skip over a portion of the periphery of the predetermined removeable portion 100.

The predetermined removeable portion 100 can have a periphery 14. The length of the periphery 14 of the predetermined removeable portion 100 is computed to include the length of the chad 90 or chads 90 as if the cut extended in a straight line between adjacent cut portions. To provide for a chad 90 or chads 90 that are easily separated from the remainder of the shrink sleeve 50, it can be practical for about 0.05% to about 10% of the length of the periphery 14 of the predetermined removeable portion 100 to be joined to the remainder of the shrink sleeve 50 by the chad 90 or chads 90 prior to removing the predetermined removeable portion 100.

The chad 90 or chads 90 individually can have a chad length 191 between about 0.01 mm to about 10 mm. The chad 90 or chads 90 individually can have a chad length 191 between about 0.01 mm to about 4 mm. The chad 90 or chads 90 individually can have a chad length 191 between about 0.01 mm to about 2 mm.

To provide for a predetermined removeable portion 100 that can be more easily separated from the remainder of the shrink sleeve 50, the predetermined removeable portion 100 can be cut free from the shrink sleeve 50 before the predetermined removeable portion 100 is removed from the shrink sleeve 50. In this example approach, there is not a chad 90 that connects the predetermined removeable portion 100 to the shrink sleeve 50. Providing a chad 90 or chads 90 can be advantageous over predetermined removeable portion 100 that is cut free from the shrink sleeve 50 because there is lower likelihood that the predetermined removeable portion 100 will unintentionally and or uncontrollably fall away from the remainder of the shrink sleeve 50 prior to the striker 130 removing the predetermined removeable portion 100.

The predetermined removeable portion 100 can cover a through handle 11 or pinch grip 12 prior to removal of the predetermined removeable portion 100. To provide for a shaped surface to which the consumer's hand can conform to when she uses the through handle 11 or pinch grip 12, it can be practical to provide a predetermined removeable portion 100 that is dimensionally more extensive than the through handle 11 or pinch grip 12. The through handle 11 may have a through handle open area 13. The predetermined removeable portion 100 may have predetermined removeable portion area 101. The predetermined removeable portion area 101 may be about 5% greater than the handle open area 13. The predetermined removeable portion area 101 may be more than about 5% greater than the handle open area 13. The predetermined removeable portion area 101 may be more than about 15% greater than the handle open area 13. The predetermined removeable portion area 101 may be more than about 25% greater than the handle open area 13. The through handle open area 13 is the minimum open area of the through handle 13.

Containers 10 having a handle 11 or pinch grip 12 typically have such feature disposed away from the longitudinal axis L of the container 10. During the shrink sleeving operation, the container 10 can be conveyed on a conveyor 20 with the handle 11 or pinch grip 12 in a leading position or trailing position. A leading position is a position in which the handle 11 or pinch grip 12 is on the side of the container 10 that is in the direction of movement of the container 10 as it is conveyed along the conveyor 20. A trailing position is a position in which the handle 11 or pinch grip 12 is on the side of the container 10 that is in the direction opposite to the direction of movement of the container 10 as it is conveyed along the conveyor 20.

To provide for clean separation of the predetermined removeable portion 100 from the remainder of the shrink sleeve 50, it can be desirable to set up the process of removal such that the predetermined removeable portion 100 is mobilized in tension when the predetermined removeable portion 100 is contacted by the striker 130 to remove the predetermined removeable portion 100 from the remainder of the shrink sleeve 50. Having the predetermined removeable portion 100 mobilized in tension can be desirable since such a mobilization can help to maintain the predetermined removeable portion 100 in a generally flat state. In general, a generally flat predetermined removeable portion 100 is easy to remove by a striker 130.

An optional arrangement for the striker 130 relative to the predetermined removeable portion 100 can be to locate the chad 190 or chads 190 in the upper narrower portion of the handle 11 or grip 12 shown in FIG. 9 and to position the striker so that the portion of the striker 130 contacting the predetermined removeable portion 100 is moving tangentially in a direction towards the lower narrower portion of the handle 11 or grip 12.

Figure 10:
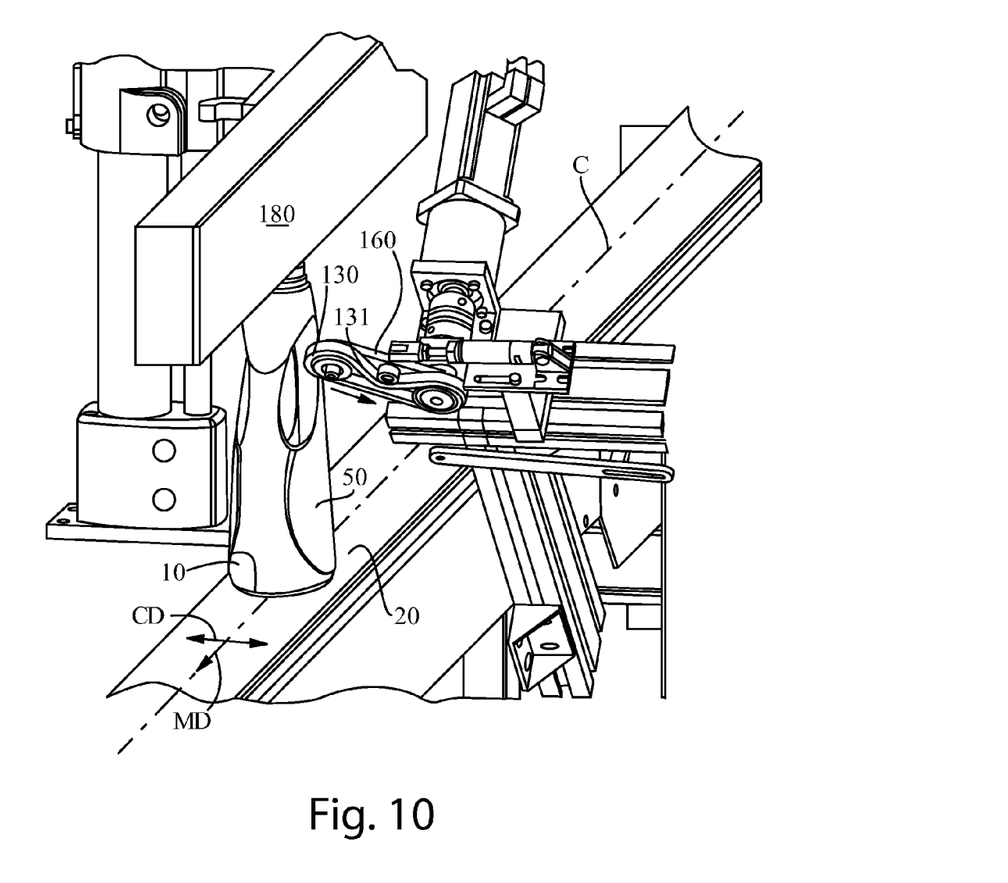
FIG. 10 is a view of a portion of an apparatus for removing predetermined removable portions with a pair of strikers.

The striker 130 can be a belt 131, as shown in FIG. 10. The belt 131 can be a motor driven belt 131. A motor driven belt 131 is thought to be practical in that as the belt 131 is moved into contact with the predetermined removeable portion 100 the belt 131 frictionally engages with the predetermined removeable portion 100 and shears the predetermined removeable portion 100 from the remainder of the shrink sleeve 50. To enhance the ability for the belt 131 to remove the predetermined removeable portion 100 from the shrink sleeve 50, the belt 131 can be driven to move in a direction such that there is a component that is in a direction opposite to the direction of movement of the conveyor 20.

The belt 131 can comprise a compliant surface. The belt 131 can comprise a surface that can develop force mobilized in shear between the belt 131 and the predetermined removeable portion 100. In essence, the surface of the belt 131 needs to be sufficiently tacky with respect to the predetermined removeable portion 100 so that the belt 131 can pull the predetermined removeable portion 100 from the remainder of the shrink sleeve 50. For typical shrink sleeves 50, a belt 131 having a rubber surface is practical. The belt 131 can be a 0.635 cm thick 23 durometer blue urethane cover on a 134 XL037 (34.0360 cm long) neoprene timing belt from F N Sheppart & Co., Erlanger, Ky., United States.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus comprising:
    a conveyor having a machine direction and a cross-machine direction and a pair of edges spaced apart from one another in said cross-machine direction;
    a striker having a first position and a second position, wherein said striker in said first position is located at a predetermined location above said conveyor, wherein said striker in said second position is remote from said predetermined location;
    a driver operatively engaged with said striker to move said striker from said first position to said second position; and
    a vacuum port proximal to said striker when said striker is in said first position.

2. The apparatus according to claim 1, wherein in said first position a portion of said striker is moving tangentially relative to said predetermined location.

3. The apparatus according to claim 2, wherein said striker is a roller.

4. The apparatus according to claim 3, wherein said striker is pivotably mounted.

5. The apparatus according to claim 4, wherein said apparatus comprises a laser up-line of said striker.

6. The apparatus according to claim 5, wherein said apparatus comprises two of said strikers and said conveyor has a machine direction and a cross-machine direction orthogonal to said machine direction and a centerline, wherein a projection of said centerline orthogonal to said machine direction and said cross-machine direction and above said conveyor is between said strikers.

7. The apparatus according to claim 6, wherein said apparatus comprises a top restraint guide positioned above said conveyor.

8. The apparatus according to claim 7, wherein said top restraint guide comprises a belt having a drive direction in said machine direction.

9. The apparatus according to claim 1, wherein said striker is a belt.

10. The apparatus according to claim 1, wherein said striker is reciprocatingly mounted.

11. The apparatus according to claim 1, wherein said driver is a servo motor.

12. The apparatus according to claim 1, wherein said driver is an air cylinder.

13. The apparatus according to claim 1, wherein said apparatus comprises a top restraint guide positioned above said conveyor.

14. The apparatus according to claim 1, wherein said striker is pivotably mounted.

15. The apparatus according to claim 1, wherein said apparatus comprises two of said strikers and said conveyor has a machine direction and a cross-machine direction orthogonal to said machine direction and a centerline, wherein a projection of said centerline orthogonal to the machine direction and cross-machine direction and above said conveyor is between said strikers.

16. The apparatus according to claim 6, wherein said striker in said first position is located laterally within said pair of edges.

17. An apparatus comprising:
    a conveyor having a machine direction and a cross-machine direction and a pair of edges spaced apart from one another in said cross-machine direction;
    a striker having a first position and a second position, wherein said striker in said first position is located at a predetermined location above said conveyor, wherein said striker in said second position is remote from said predetermined location;
    a driver operatively engaged with said striker to move said striker from said first position to said second position; and
    a vacuum port proximal to said striker when said striker is in said first position;
    wherein in said first position a portion of said striker is moving tangentially relative to said predetermined location;
    wherein said striker is a roller;
    wherein said striker is pivotably mounted; and
    wherein said apparatus comprises two of said strikers and said conveyor has a machine direction and a cross-machine direction orthogonal to said machine direction and a centerline, wherein a projection of said centerline orthogonal to said machine direction and said cross-machine direction and above said conveyor is between said strikers.

18. The apparatus according to claim 17, wherein said striker in said first position is located laterally within said pair of edges.

\* \* \* \* \*